United States Patent
Hu et al.

(10) Patent No.: US 9,467,936 B2
(45) Date of Patent: Oct. 11, 2016

(54) MULTIMODE TERMINAL AND SERVICE IMPLEMENTATION METHOD FOR MULTIMODE TERMINAL

(75) Inventors: Qiulin Hu, Shenzhen (CN); Liyuan He, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/401,174

(22) PCT Filed: Jul. 11, 2012

(86) PCT No.: PCT/CN2012/078475
§ 371 (c)(1),
(2), (4) Date: Nov. 14, 2014

(87) PCT Pub. No.: WO2013/170529
PCT Pub. Date: Nov. 21, 2013

(65) Prior Publication Data
US 2015/0105074 A1    Apr. 16, 2015

(30) Foreign Application Priority Data
May 14, 2012   (CN) .......................... 2012 1 0149563

(51) Int. Cl.
*H04W 4/00* (2009.01)
*H04W 48/18* (2009.01)
(Continued)

(52) U.S. Cl.
CPC ............. *H04W 48/18* (2013.01); *H04W 48/06* (2013.01); *H04W 88/06* (2013.01)

(58) Field of Classification Search
CPC ... H04W 48/18; H04W 48/06; H04W 88/06; H04W 36/14; H04W 36/165
USPC ...... 455/435.2, 435.3, 525, 552.1, 434, 510, 455/26.1, 528, 422.1, 443
See application file for complete search history.

(56) References Cited

U.S. PATENT DOCUMENTS

| 2009/0113034 A1* | 4/2009 | Krishnappa ............. G06F 15/16 709/223 |
| 2011/0014913 A1 | 1/2011 | Yoon et al. |

(Continued)

FOREIGN PATENT DOCUMENTS

| CN | 101945502 A | 1/2011 |
| CN | 101977409 A | 2/2011 |

(Continued)

OTHER PUBLICATIONS

International Search Report for corresponding application PCT/CN2012/078475 filed on Jul. 11, 2014; Mail date Aug. 30, 2012.

(Continued)

*Primary Examiner* — Inder Mehra
(74) *Attorney, Agent, or Firm* — Cantor Colburn LLP

(57) ABSTRACT

Provided are a multimode terminal and a service implementation method for a multimode terminal. The multimode terminal includes: a master controller, a slave controller, a subscriber identity module card, a first radio frequency chip, a first antenna, a second radio frequency chip and a second antenna. The master controller includes: a main processor, configured to select a network system for executing a current service and call a processing chip of the selected network system to execute the current service, and a first processing chip of a first network system; the slave controller includes: a second processing chip of a second network system; and the subscriber identity module card is coupled with the master controller and the slave controller respectively. By the technical solution, a network resource can be fully utilized.

14 Claims, 5 Drawing Sheets

(51) Int. Cl.
*H04W 48/06* (2009.01)
*H04W 88/06* (2009.01)

(56) References Cited

U.S. PATENT DOCUMENTS

| | | | | |
|---|---|---|---|---|
| 2011/0287807 A1* | 11/2011 | Jung | ............... | H04B 1/0064 455/557 |
| 2012/0140709 A1* | 6/2012 | Hou | ............... | H04W 56/0015 370/328 |

FOREIGN PATENT DOCUMENTS

| CN | 101977417 A | 2/2011 |
|---|---|---|
| CN | 101984729 A | 3/2011 |
| CN | 101986767 A | 3/2011 |
| CN | 102158934 A | 8/2011 |
| EP | 1679917 A2 | 7/2006 |
| EP | 1885141 A1 | 2/2008 |
| EP | 2542021 A1 | 1/2013 |
| EP | 2544504 A1 | 1/2013 |
| EP | 2621216 A1 | 7/2013 |
| WO | 2011056252 A1 | 5/2011 |

OTHER PUBLICATIONS

European Search Report issued Sep. 2, 2015 re: Application No. PCT/CN2012/078475; pp. 1-11; citing: EP2621216A1, WO2011150770A1, EP2544504A1, CN101984729A, EP2542021A, WO2012051807A1, US2011014913A1, EP1885141A1 and EP1679917A2.

* cited by examiner

MULTIMODE TERMINAL AND SERVICE IMPLEMENTATION METHOD FOR MULTIMODE TERMINAL

TECHNICAL FIELD

The disclosure relates to the field of communication, in particular to a multimode terminal and a service implementation method for a multimode terminal.

BACKGROUND

Along with the development of a $3^{rd}$ Generation (3G) network, there are more and more 3G users, and respective operators throughout the world have started to lay out a $4^{th}$ Generation (4G) network. However, the reality is that the vast majority of current terminal users are $2^{nd}$ Generation (2G) users; therefore, most of user data is born in a 2G network, which leads to the condition that the 2G network is very busy, but most of resources of the 3G/4G network are idle in most of the time.

At present, multiple network systems can be integrated in one piece of terminal equipment, but different network systems correspond to different subscriber identity module cards substantially. Because different subscriber identity module cards are charged respectively, a subscriber identity module card cannot be switched to a network system corresponding to another subscriber identity module card when being used for initiating a service by a user. Therefore, the network traffic distribution of various services cannot be realized, and the network resources of respective networks cannot be maximally utilized.

SUMMARY

In view of the problem that the network traffic distribution of various services cannot be realized and the network resources of respective networks cannot be maximally utilized in a related art, the embodiments of the disclosure provide a multimode terminal and a service implementation method for a multimode terminal, so as to solve the problems.

According to one embodiment of the disclosure, a multimode terminal is provided, including: a master controller, a slave controller, a subscriber identity module card, a first radio frequency chip, a first antenna, a second radio frequency chip and a second antenna, wherein the master controller includes: a main processor, configured to select a network system for executing a current service according to a preset network system selection strategy corresponding to a service type of the current service of the multimode terminal and a network condition of a current environment where the multimode terminal is located, and call a processing chip of the selected network system to execute the current service, network systems including a first network system and a second network system and a selection priority sequence of the network systems is recorded in the network system selection strategy, and a first processing chip of the first network system, coupled with the first antenna through the first radio frequency chip and configured to conduct communication between the multimode terminal and a network side of the first network system in a network of the first network system; the slave controller includes: a second processing chip of the second network system, coupled with the second antenna through the second radio frequency chip and configured to conduct communication between the multimode terminal and a network side of the second network system in a network of the second network system; the subscriber identity module card is coupled with the master controller and the slave controller respectively, and simultaneously resides in the networks of the first and second network systems through the master controller and the slave controller; and the first radio frequency chip and the first antenna are independent of the second radio frequency chip and the second antenna.

In the described embodiment, the multimode terminal further includes: a Wireless Fidelity (WIFI) module and a third antenna coupled with the WIFI module, wherein the WIFI module includes: a WIFI processing chip, coupled with the master controller and configured to conduct communication between the multimode terminal and a WIFI network.

In the described embodiment, the multimode terminal further includes: a switch, deployed between the subscriber identity module card and the master and slave controllers and configured to connect the subscriber identity module card with or disconnect the subscriber identity module card from the master controller or the slave controller.

In the described embodiment, the first processing chip is further configured to conduct communication between the multimode terminal and a network side of a third network system.

In the described embodiment, the first network system is one of a Time Division (TD) system network and a Global System for Mobile Communications (GSM) network, the third network system is the other of the TD system network and the GSM network, and the second network system is a Long Term Evolution (LTE) network.

According to the other embodiment of the disclosure, a service implementation method for a multimode terminal is provided, which is applied to the multimode terminal, the method including: acquiring a preset network system selection strategy corresponding to a service type of a current service of the multimode terminal, wherein a selection priority sequence of network systems is recorded in the network system selection strategy; selecting a network system with the highest selection priority in the network system selection strategy from the network systems existing in a current environment according to a network condition of the current environment where the multimode terminal is located; and calling a processing chip, corresponding to the selected network system, of the multimode terminal to execute the current service.

In the described embodiment, the service type includes: a data service, a video call service or a voice service; and the network systems include: a WIFI network, a TD system network or a GSM network, and an LTE network.

In the described embodiment, a selection priority sequence of the network systems recorded in a network system selection strategy corresponding to the data service is: the WIFI network, the LTE network, and the TD system or the GSM network; a selection priority sequence of the network systems recorded in a network system selection strategy corresponding to the video call service is: the LTE network, and the TD system network or the GSM network; and a selection priority sequence of the network systems recorded in a network system selection strategy corresponding to the voice service is: the TD system network or the GSM network, and the LTE network.

In the described embodiment, under the condition that the multimode terminal initiates the data service, selecting the network system with the highest selection priority in the network system selection strategy from the network systems existing in the current environment according to the network condition of the current environment where the multimode terminal is located includes: judging whether the WIFI network exists in the current environment or not, and selecting the WIFI network if the WIFI network exists in the current environment; if the WIFI network does not exist in the current environment, judging whether a subscriber identity module card of the multimode terminal resides in the LTE network or not, determining that the LTE network exists in the current environment if the subscriber identity module card of the multimode terminal resides in the LTE network, and selecting the LTE network; and if the LTE network does not exist in the current environment, selecting the TD system network or the GSM network.

In the described embodiment, under the condition that the multimode terminal initiates or receives the video call service, selecting the network system with the highest selection priority in the network system selection strategy from the network systems existing in the current environment according to the network condition of the current environment where the multimode terminal is located includes: judging whether the subscriber identity module card of the multimode terminal resides in the LTE network or not, determining that the LTE network exists in the current environment if the subscriber identity module card of the multimode terminal resides in the LTE network, and selecting the LTE network; and if the LTE network does not exist in the current environment, selecting the TD system network or the GSM network.

By the embodiments of the disclosure, the subscriber identity module card of the multimode terminal simultaneously resides in multiple network systems through multiple controllers, and when executing a service, the terminal can select the network system for executing the current service according to the network system selection strategy corresponding to the service type of the current service and the network condition of the current environment, and calls a corresponding baseband processing chip to execute the current service, so that the problem that a certain network resource is congested while another network resource is idle due to the fact that all services are executed under the same network system is solved, a requirement of a user is met, and meanwhile, network resources of each network system are maximally utilized.

BRIEF DESCRIPTION OF THE DRAWINGS

The drawings are described here to provide further understanding of the disclosure, and form a part of the disclosure. The schematic embodiments and description of the disclosure are adopted to explain the disclosure, and do not form improper limits to the disclosure. In the drawings.

DETAILED DESCRIPTION OF THE EMBODIMENTS

The disclosure is described below with reference to the drawings and the embodiments in detail. It is important to note that the embodiments of the disclosure and the characteristics in the embodiments can be combined under the condition of no conflicts.

Figure 1:
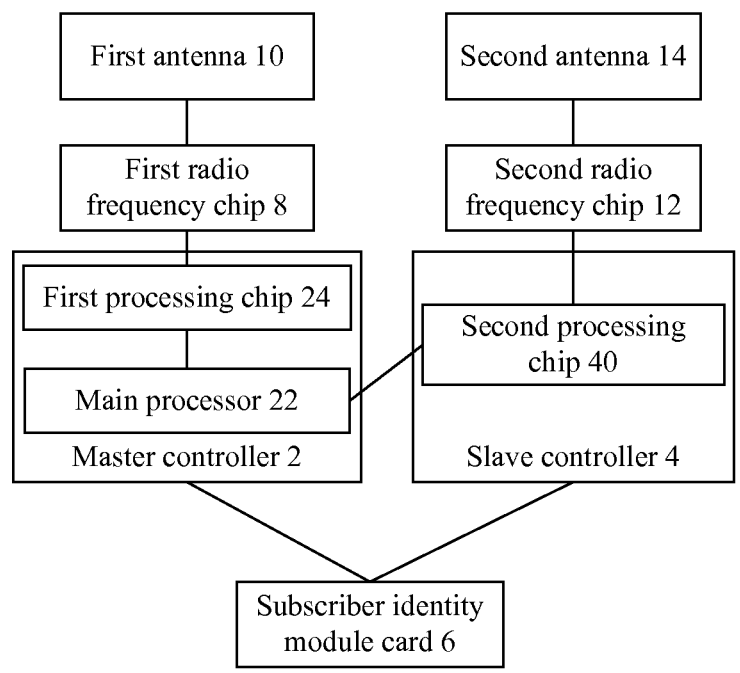
FIG. 1 is a structure diagram of a multimode terminal according to an embodiment of the disclosure.

FIG. 1 is a structure diagram of a multimode terminal according to an embodiment of the disclosure. As shown in FIG. 1, the multimode terminal includes: a master controller 2, a slave controller 4, a subscriber identity module card 6, a first radio frequency chip 8, a first antenna 10, a second radio frequency chip 12 and a second antenna 14. Each part is described below respectively.

As shown in FIG. 1, the master controller 2 includes: a main processor 22, configured to select a network system for executing a current service according to a preset network system selection strategy corresponding to a service type of the current service of the multimode terminal and a network condition of a current environment where the multimode terminal is located, and call a processing chip of the selected network system to execute the current service, wherein network systems include a first network system and a second network system, and a selection priority sequence of the network systems is recorded in the network system selection strategy; and a first processing chip 24 (which can also be called a baseband processing chip) of the first network system, coupled with the first antenna 10 through the first radio frequency chip 8 and configured to conduct communication between the multimode terminal and a network side of the first network system in a network of the first network system.

The slave controller 4 includes: a second processing chip 40 (which can also be called a baseband processing chip) of the second network system, coupled with the second antenna 14 through the second radio frequency chip 12 and configured to conduct communication between the multimode terminal and a network side of the second network system in a network of the second network system.

The subscriber identity module card 6 is coupled with the master controller 2 and the slave controller 4 respectively, and simultaneously resides in the networks of the first and second network systems through the master controller 2 and the slave controller 4.

In the embodiment of the disclosure, the first radio frequency chip 8 and the first antenna 10 are configured to realize the data transmission and reception of the multimode terminal under the first network system; and the second radio frequency chip 12 and the second antenna 14 are configured to realize the data transmission and reception of the multimode terminal under the second network system. Moreover, in the embodiment of the disclosure, the first radio frequency chip 8 and the first antenna 10 are independent of the second radio frequency chip 12 and the second antenna 14.

The multimode terminal provided by the embodiment of the disclosure is provided with only one subscriber identity module card 6 which can be operated by both the master controller 2 and the slave controller 4, so that the subscriber identity module card 6 can simultaneously reside in the first and second network systems through the master and slave controllers during normal use, and when the multimode terminal executes the service, the master controller 2 can select one of the processing chips of the first and second network systems to execute the current service according to the service type of the current service and the network environment where the multimode terminal is located, which can meet a requirement of a user, maximally utilize a network resource of each network, solve the problem of network resource insufficiency caused by the execution of all services in the same network and increase a utilization rate of the network resources.

In the embodiment of the disclosure, different network system selection strategies can be set for different service types, so that an optimal link can be selected for executing the service of each type.

Figure 2:
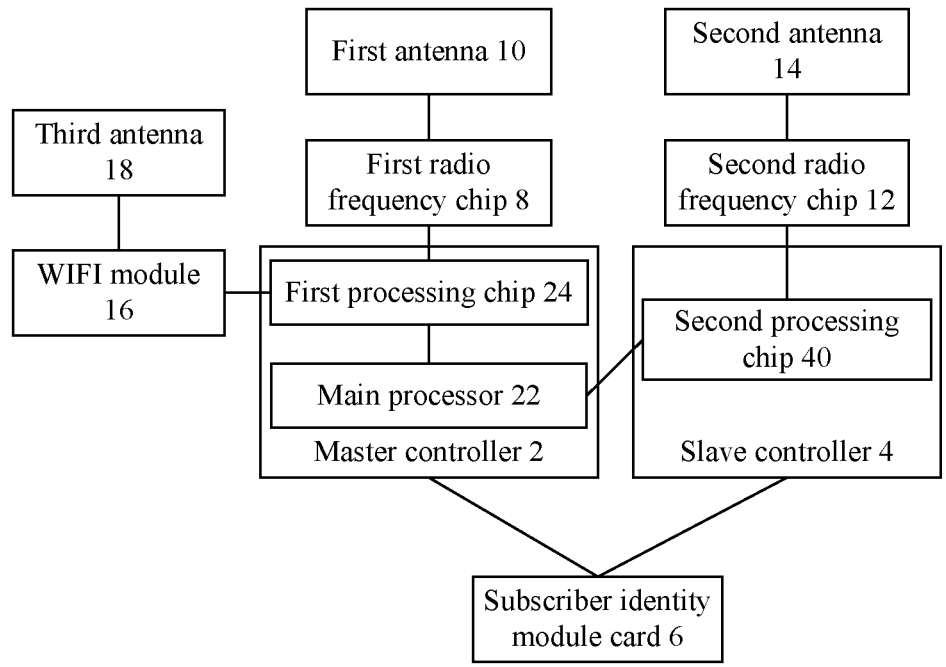
FIG. 2 is a structure diagram of a multimode terminal according to an exemplary embodiment of the disclosure.

In an exemplary embodiment of the embodiment of the disclosure, in order to facilitate the transmission of a data service, as shown in FIG. 2, the multimode terminal can further include: a WIFI module 16 and a third antenna 18 coupled with the WIFI module 16, wherein the WIFI module 16 includes: a WIFI processing chip, coupled with the master controller 2 and configured to conduct communication between the multimode terminal and a WIFI network. In the exemplary embodiment, a network system selection strategy corresponding to the data service can be set to preferably select the WIFI network, so that when the multimode terminal initiates the data service, the master controller 2 calls the WIFI processing chip of the WIFI module 16 to execute the data service, which can improve the transmission efficiency of the data service and lower the cost of the user.

Figure 3:
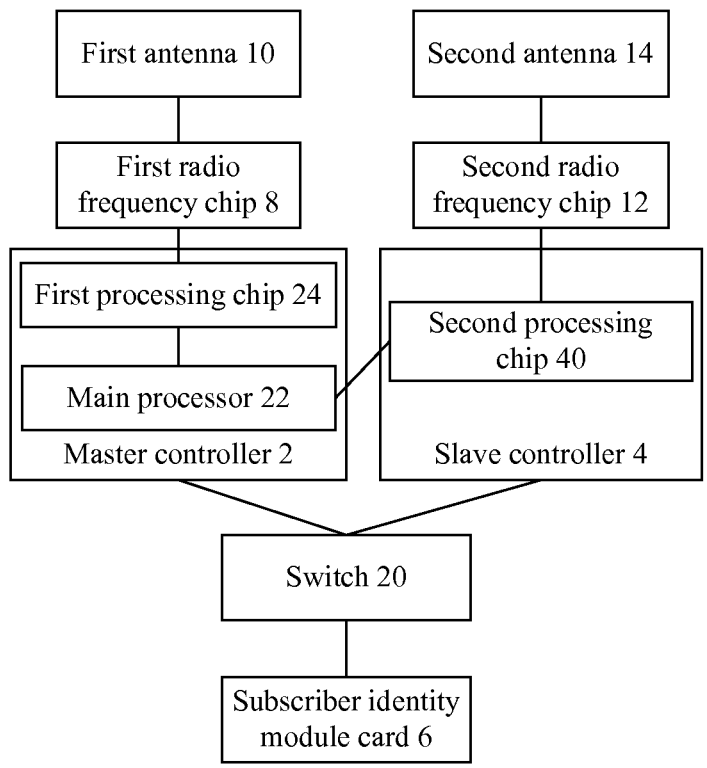
FIG. 3 is a structure diagram of a multimode terminal according to another exemplary embodiment of the disclosure.

In another exemplary embodiment of the embodiment of the disclosure, as shown in FIG. 3, the multimode terminal can further include: a switch 20, deployed between the subscriber identity module card 6 and the master and slave controllers 2 and 4 to connect the subscriber identity module card 6 with or disconnect the subscriber identity module card 6 from the master controller 2 or the slave controller 4. In the exemplary embodiment, after the master controller 2 selects the network system for executing the current service, the switch 20 can be triggered to connect the controller where the baseband processing chip of the network system is located with the subscriber identity module card 6 and simultaneously disconnect the subscriber identity module card 6 from the other controller.

In the exemplary embodiment, the first baseband processing chip 24 can integrate modulation and demodulation functions of two network systems, so that the first baseband processing chip 24 is further configured to conduct communication between the multimode terminal and a network side of a third network system in another exemplary embodiment of the embodiment of the disclosure.

In the exemplary embodiment of the embodiment of the disclosure, the first network system can be one of a TD system network and a GSM network, and the third network system can be the other of the TD system network and the GSM network, that is, the first baseband processing chip 24 can realize TD and GSM modulation and demodulation functions; and the second network system can be an LTE network.

Figure 4:
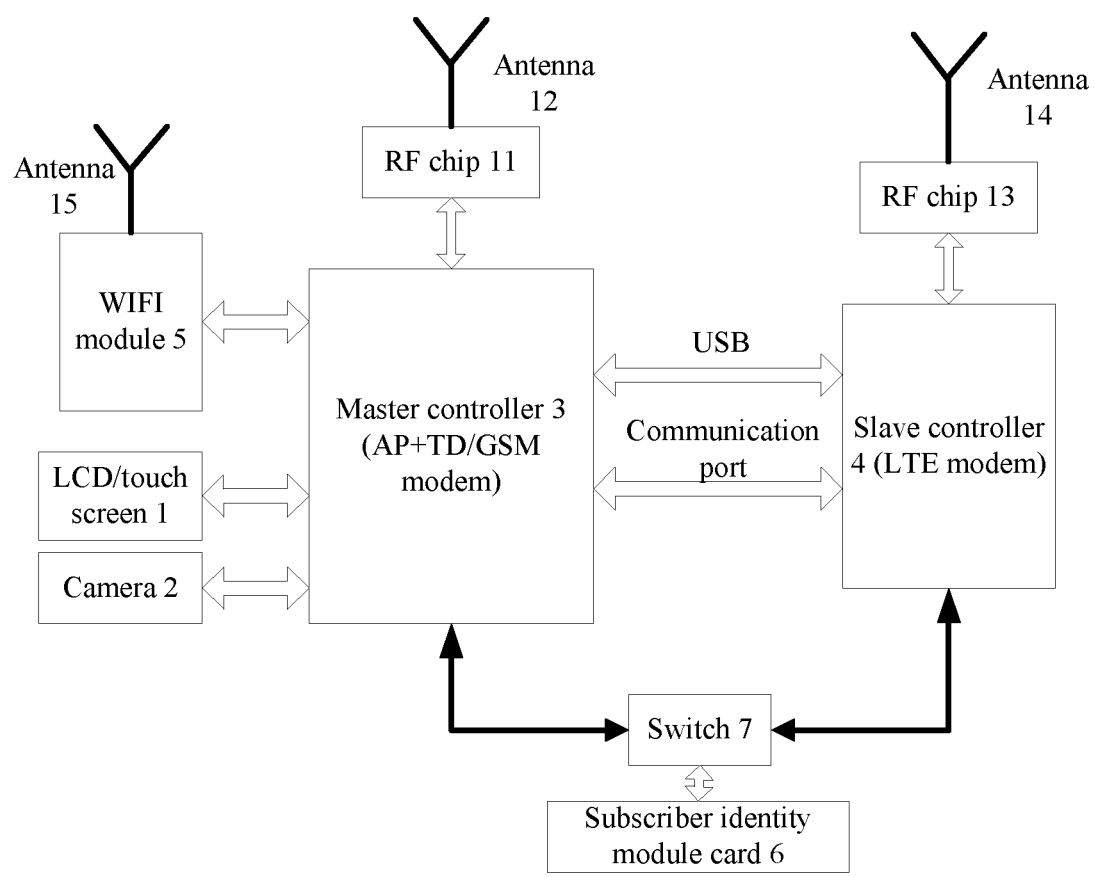
FIG. 4 is a structure diagram of a multimode terminal according to another exemplary embodiment of the disclosure.

FIG. 4 is a structure diagram of a multimode terminal according to an exemplary embodiment of the disclosure, and as shown in FIG. 4, the multimode terminal in the exemplary embodiment can include the following functional modules:

(1) various universal modules on a current terminal, such as a Liquid Crystal Display (LCD) screen, a touch screen 1 or a camera 2;

(2) a master control module 3 (equivalent to the master controller): the module includes a main processor of an intelligent machine, a TD/GSM modem (i.e. a baseband processing chip of a TD/GSM network system) is integrated in the main processor, and the module is provided with an independent radio frequency chip 11 (i.e. a Personal Assistant (PA) and a transceiver) and an independent antenna 12, so that a subscriber identity module card 6 can reside on a TD or GSM network; and a function of the TD/GSM network system is realized by the module, so that the module can also be called a TD/GSM module;

(3) a slave control module 4 (equivalent to the slave controller): the module mainly includes an LTE modem (i.e. a baseband processing chip of an LTE network system), and is provided with an independent radio frequency chip 13 and an independent antenna 14, so that the subscriber identity module card 6 can reside on an LTE network; and a function of the LTE network system is realized by the module, so that the module can also be called an LTE module;

(4) a WIFI module 5: the module includes a WIFI chip (i.e. the WIFI processing chip) and an independent antenna 15, and when there is a WIFI network, the terminal can access the Internet through the WIFI network; and (5) the subscriber identity module card 6: the multimode terminal is provided with only one subscriber identity module card which can be operated by both the master control module 3 and the slave control module 4, and the subscriber identity module card 6 can simultaneously reside in the TD/GSM and LTE networks through the master and slave control modules during normal use. As shown in FIG. 4, the subscriber identity module card 6 can be switched between the master control module 3 and the slave control module 4 through a switch 7.

A service implementation manner for the multimode terminal in the exemplary embodiment is described below by taking the active service initiation and passive service reception of the multimode terminal as examples respectively.

(1) The Multimode Terminal Initiates a Service Flow as Master Equipment:

when a user initiates a service, the master control module 3 can call a corresponding network resource to execute the service by judging whether the service is a data service, a videophone service or a voice service. For example, ① when the user initiates the data service, the master control module 3 judges whether there is a WIFI network or not in a range where the user is located at first, and a data service requirement of the user is implemented through the WIFI module 5 if there is a WIFI network; if there is no WIFI network in the range where the user is located, whether the subscriber identity module card 6 resides on the LTE network or not is judged, it shows that the LTE network exists at present if the subscriber identity module card 6 resides on the LTE network, and the data service requirement of the user is implemented through the slave control module 4; and if there is no LTE network in the range where the user is located, the data service is implemented in a TD/GSM network through the master control module 3. ② When the user initiates the videophone service, the master control module 3 judges whether the subscriber identity module card reside in the LTE network or not in the range where the user is located, and if there is an LTE network, a videophone service requirement of the user is implemented through the slave control module 4; and if there is no LTE network in the range where the user is located, the videophone service is implemented through the master control module 3. ③ When the user initiates the voice service, few network resources are consumed by the voice service, so that the voice service is implemented directly through the TD/GSM control module.

(2) The Terminal Receives a Service Flow as Slave Equipment:

when the user receives an external service, the master control module 3 can call a corresponding network resource to execute the external service by judging whether the external service is a videophone service or a voice service. For example, ① when the terminal receives the service, the service is received through the master control (TD/GSM) module and the slave control (LTE) module respectively, the master control module 3 calls the LTE module (i.e. the slave control module 4) if determining that the service is the videophone service, and the videophone service is implemented through the slave control module 4 if there is an LTE network in the range, and is implemented through the master control module if there is no LTE network in the range; and ② when the terminal receives the voice service, the voice service is implemented directly through the master control module.

According to the embodiment of the disclosure, a service implementation method for a multimode terminal is also provided, which is applied to the multimode terminal provided by the embodiment of the disclosure.

Figure 5:
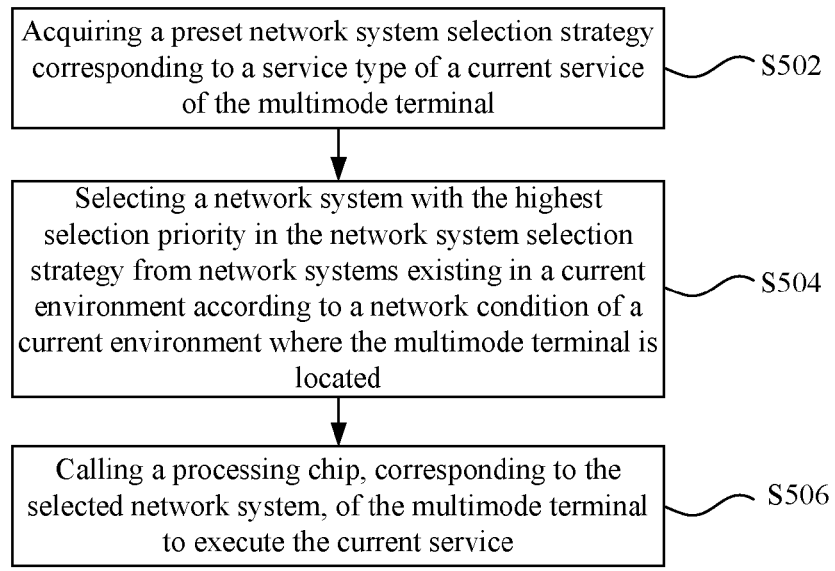
FIG. 5 is a flowchart of a service implementation method for a multimode terminal according to an embodiment of the disclosure.

FIG. 5 is a flowchart of a service implementation method for a multimode terminal according to an embodiment of the disclosure, and as shown in FIG. 5, the method mainly includes the following S502 to S506.

S502: acquiring a preset network system selection strategy corresponding to a service type of a current service of the multimode terminal, wherein a selection priority sequence of network systems is recorded in the network system selection strategy.

S504: selecting a network system with the highest selection priority in the network system selection strategy from the network systems existing in a current environment according to a network condition of the current environment where the multi mode terminal is located.

S506: calling a processing chip, corresponding to the selected network system, of the multimode terminal to execute the current service.

In an exemplary embodiment of the embodiment of the disclosure, the service type includes, but not limited to: a data service, a video call service or a voice service; and the network systems include, but not limited to: a WIFI network, a TD system network or a GSM network, and an LTE network.

In an exemplary embodiment of the embodiment of the disclosure, the following network system selection strategies can be set for each service type respectively:

(1) a selection priority sequence of the network systems recorded in a network system selection strategy corresponding to the data service is: the WIFI network, the LTE network, and the TD system or the GSM network;

(2) a selection priority sequence of the network systems recorded in a network system selection strategy corresponding to the video call service is: the LTE network, and the TD system network or the GSM network; and (3) a selection priority sequence of the network systems recorded in a network system selection strategy corresponding to the voice service is: the TD system network or the GSM network, and the LTE network.

In the exemplary embodiment, under the condition that the multimode terminal actively initiates the data service, selecting the network system with the highest selection priority in the network system selection strategy from the network systems existing in the current environment according to the network condition of the current environment where the multimode terminal is located can include the following steps:

S1: judging whether the WIFI network exists in the current environment or not, and selecting the WIFI network if the WIFI network exists in the current environment;

S2: if the WIFI network does not exist in the current environment, judging whether a subscriber identity module card of the multimode terminal resides in the LTE network or not, determining that the LTE network exists in the current environment if the subscriber identity module card of the multimode terminal resides in the LTE network, and selecting the LTE network; and S3: if the LTE network does not exist in the current environment, selecting the TD system network or the GSM network.

In the exemplary embodiment, under the condition that the multimode terminal initiates or receives the video call service, selecting the network system with the highest selection priority in the network system selection strategy from the network systems existing in the current environment according to the network condition of the current environment where the multimode terminal is located can include the following steps:

S1: judging whether the subscriber identity module card of the multimode terminal resides in the LTE network or not, determining that the LTE network exists in the current environment if the subscriber identity module card of the multimode terminal resides in the LTE network, and selecting the LTE network; and S2: if the LTE network does not exist in the current environment, selecting the TD system network or the GSM network.

In order to further describe the technical scheme provided by the embodiment of the disclosure, the technical scheme is described below by taking the active service initiation and passive service reception of the multimode terminal as examples. In the following embodiments, a service type includes: a data service, a video call service and a voice service; and network systems include: a WIFI network, a TD system network or a GSM network, and an LTE network.

Embodiment 1

Figure 6:
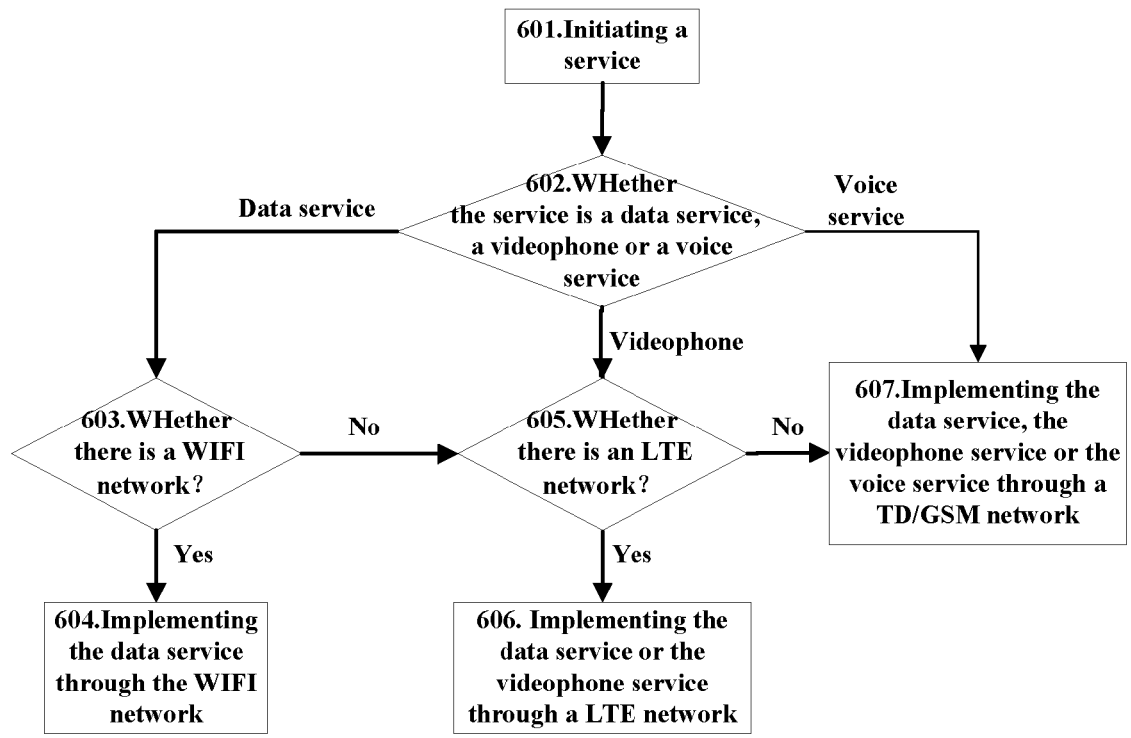
FIG. 6 is a flowchart of actively initiating a service by a multimode terminal according to an embodiment of the disclosure.

In the embodiment, the multimode terminal actively initiates a service flow as master equipment. As shown in FIG. 6, a service implementation flow of the multimode terminal in the embodiment mainly includes the following steps that:

S601: a user initiates a service by operating the terminal equipment.

S602: the terminal equipment judges whether the service type of the service is the data service, the videophone service or the voice service, executes S603 if the service is the data service, executes S605 if the service is the videophone service, and executes S607 if the service is the voice service.

S603: the terminal equipment judges whether there is a WIFI network or not in a current range where the terminal equipment is located, executes S604 if there is a WIFI network, otherwise executes S605.

S604: the terminal equipment implements a current service requirement of the user through a WIFI module.

S605: the terminal equipment judges whether a subscriber identity module card resides on the LTE network or not, determines that the LTE network exists in the current environment if the subscriber identity module card resides on the LTE network, executes S606, otherwise executes S607.

S606: the terminal equipment implements the current service requirement of the user through the slave control (LTE) module.

S607: the current service is implemented through a master control (TD/GSM) module.

Embodiment 2

Figure 7:
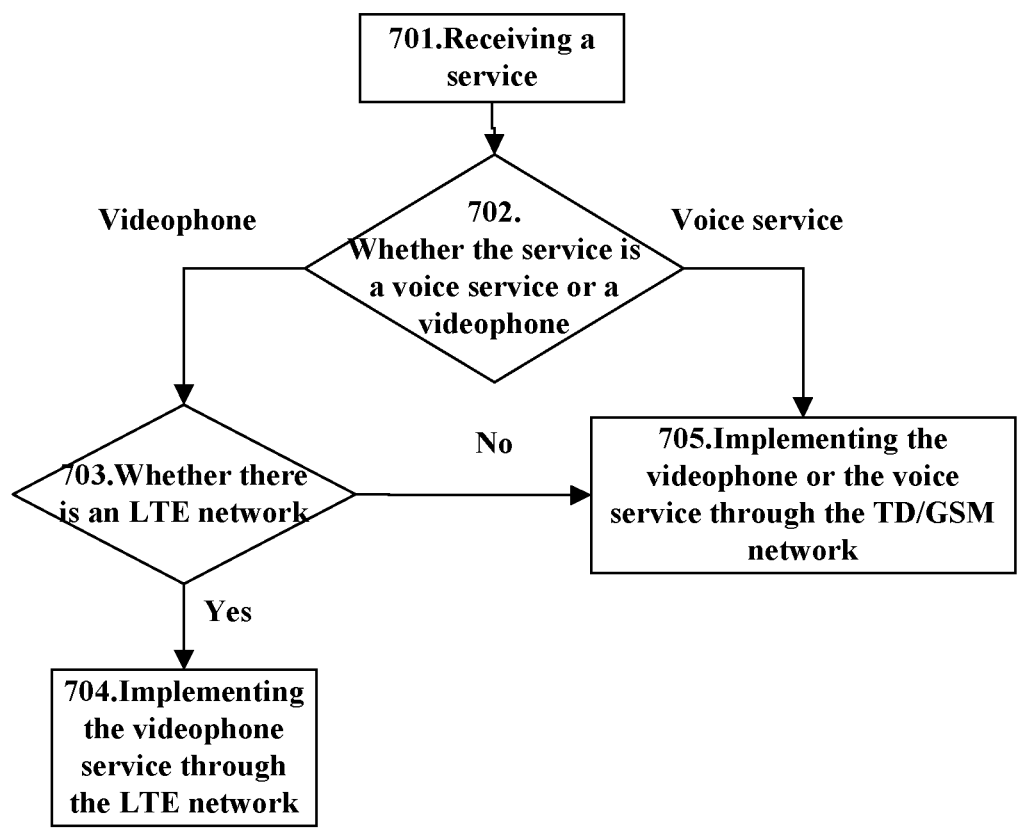
FIG. 7 is a flowchart of passively receiving a service by a multimode terminal according to an embodiment of the disclosure.

In the embodiment, the terminal receives a service as slave equipment, FIG. 7 is a flowchart of passively receiving a service by a multimode terminal according to an embodiment of the disclosure, and as shown in FIG. 7, a service implementation flow of the terminal equipment in the embodiment mainly includes the following steps:

S701: a master control module or a slave control module of the terminal equipment receives the service;

S702: the terminal equipment judges whether the current service is the videophone service or the voice service, executes S703 if the service is the videophone service, and executes S705 if the service is the voice service;

S703: whether there is an LTE network or not in the current environment is judged, S704 is executed if there is an LTE network, otherwise S705 is executed;

S704: the slave control module (i.e. a controller corresponding to the LTE network) of the terminal equipment is called to execute the current service; and S705: the current service is executed through the master control (TD/GSM) module.

In the embodiment, when the terminal receives the service, the service is received through the master control (TD/GSM) module and the slave control (LTE) module respectively, the LTE module is called if the service is determined to be a videophone, and the videophone service is implemented through the slave control LTE module if there is an LTE network in the current environment; if there is no LTE network in the current environment, the videophone service is implemented through the master control (TD/GSM) module; and when the terminal receives the voice service, the voice service is implemented directly through the master control module.

From the above, it can be seen that by one or more embodiments of the disclosure, when operating a service, the terminal automatically allocates an optimal link according to the initiated service and a network condition of a region where the terminal is located, so that the condition that the network is excessively busy and congested due to the fact that a network resource suitable for a data service cannot be fully utilized and a network resource suitable for a voice service is continuously utilized is avoided; and the requirement of the user is met, and meanwhile, the performance of each network resource is maximally utilized.

Obviously, those skilled in the art should know that each module or step of the embodiment of the disclosure can be implemented by a universal computing device, and the modules or steps can be concentrated on a single computing device or distributed on a network formed by a plurality of computing devices, and can optionally be implemented by programmable codes executable for the computing devices, so that the modules or steps can be stored in a storage device for execution with the computing devices, or can form each integrated circuit module, or multiple modules or steps therein can form a single integrated circuit module for implementation. As a consequence, the disclosure is not limited to any specific hardware and software combination.

The above is only the exemplary embodiment of the disclosure and not intended to limit the disclosure, and for the technician of the field, the disclosure can have various modifications and variations. Any modifications, equivalent replacements, improvements and the like within the spirit and principle of the disclosure shall fall within the scope of protection as defined in the appended claims of the disclosure.

What is claimed is:

1. A multimode terminal, comprising:
    a master controller, comprising:
        a main processor, configured to select a network system for executing a current service according to a preset network system selection strategy corresponding to a service type of the current service of the multimode terminal and a network condition of a current environment where the multimode terminal is located, and call a processing chip of the selected network system to execute the current service, wherein network systems comprise a first network system and a second network system, and a selection priority sequence of the network systems is recorded in the network system selection strategy; and
        a first processing chip of the first network system, coupled with a first antenna through a first radio frequency chip and configured to conduct communication between the multimode terminal and a network side of the first network system in a network of the first network system;
    a slave controller, comprising: a second processing chip of the second network system, coupled with a second antenna through a second radio frequency chip and configured to conduct communication between the multimode terminal and a network side of the second network system in a network of the second network system;
    a subscriber identity module card, coupled with the master controller and the slave controller respectively, and simultaneously residing in the networks of the first and second network systems through the master controller and the slave controller;
    the first radio frequency chip and the first antenna; and
    the second radio frequency chip and the second antenna,
    wherein the first radio frequency chip and the first antenna are independent of the second radio frequency chip and the second antenna;
    wherein the main processor is further configured to select the network system with the highest selection priority in the network system selection strategy from network systems existing in the current environment according to the network condition of the current environment where the multimode terminal is located.

2. The multimode terminal according to claim 1, further comprising: a Wireless Fidelity (WIFI) module and a third antenna coupled with the WIFI module, wherein
    the WIFI module comprises: a WIFI processing chip, coupled with the master controller and configured to conduct communication between the multimode terminal and a WIFI network.

3. The multimode terminal according to claim 2, wherein the first processing chip is further configured to conduct communication between the multimode terminal and a network side of a third network system.

4. The multimode terminal according to claim 3, wherein when the first network system is a Time Division (TD) system network, the third network system is a Global System for Mobile Communications (GSM) network; when the first network system is the GSM network, the third network system is the TD system network, and the second network system is a Long Term Evolution (LTE) network.

5. The multimode terminal according to claim 1, further comprising: a switch, deployed between the subscriber identity module card and the master and slave controllers and configured to connect the subscriber identity module card with or disconnect the subscriber identity module card from the master controller or the slave controller.

6. The multimode terminal according to claim 5, wherein the first processing chip is further configured to conduct communication between the multimode terminal and a network side of a third network system.

7. The multimode terminal according to claim 6, wherein when the first network system is a Time Division (TD) system network, the third network system is a Global System for Mobile Communications (GSM) network; when the first network system is the GSM network, the third network system is the TD system network, and the second network system is a Long Term Evolution (LTE) network.

8. The multimode terminal according to claim 1, wherein the first processing chip is further configured to conduct communication between the multimode terminal and a network side of a third network system.

9. The multimode terminal according to claim 8, wherein when the first network system is a Time Division (TD) system network, the third network system is a Global System for Mobile Communications (GSM) network; when the first network system is the GSM network, the third network system is the TD system network, and the second network system is a Long Term Evolution (LTE) network.

10. A service implementation method for a multimode terminal, the method comprising:
   acquiring a preset network system selection strategy corresponding to a service type of a current service of the multimode terminal, wherein a selection priority sequence of network systems is recorded in the network system selection strategy;
   selecting a network system with the highest selection priority in the network system selection strategy from network systems existing in a current environment according to a network condition of the current environment where the multimode terminal is located; and
   calling a processing chip, corresponding to the selected network system, of the multimode terminal to execute the current service.

11. The method according to claim 10, wherein the service type comprises: a data service, a video call service or a voice service; and the network systems comprise: a Wireless Fidelity (WIFI) network, a Time Division (TD) system network or a Global System for Mobile Communications (GSM) network, and a Long Term Evolution (LTE) network.

12. The method according to claim 11, wherein
   the selection priority sequence of the network systems recorded in the network system selection strategy corresponding to the data service is: the WIFI network, the LTE network, and the TD system or the GSM network;
   the selection priority sequence of the network systems recorded in the network system selection strategy corresponding to the video call service is: the LTE network, and the TD system network or the GSM network; and
   the selection priority sequence of the network systems recorded in the network system selection strategy corresponding to the voice service is: the TD system network or the GSM network, and the LTE network.

13. The method according to claim 12, wherein under the condition that the multimode terminal initiates the data service, selecting the network system with the highest selection priority in the network system selection strategy from the network systems existing in the current environment according to the network condition of the current environment where the multimode terminal is located comprises:
   judging whether the WIFI network exists in the current environment or not, and selecting the WIFI network if the WIFI network exists in the current environment;
   if the WIFI network does not exist in the current environment, judging whether a subscriber identity module card of the multimode terminal resides in the LTE network or not, determining that the LTE network exists in the current environment if the subscriber identity module card of the multimode terminal resides in the LTE network, and selecting the LTE network; and
   if the LTE network does not exist in the current environment, selecting the TD system network or the GSM network.

14. The method according to claim 12, wherein under the condition that the multimode terminal initiates or receives the video call service, selecting the network system with the highest selection priority in the network system selection strategy from the network systems existing in the current environment according to the network condition of the current environment where the multimode terminal is located comprises:
   judging whether the subscriber identity module card of the multimode terminal resides in the LTE network or not, determining that the LTE network exists in the current environment if the subscriber identity module card of the multimode terminal resides in the LTE network, and selecting the LTE network; and
   if the LTE network does not exist in the current environment, selecting the TD system network or the GSM network.

* * * * *